R. K. YACOOBIAN.
WATER MIXER.
APPLICATION FILED MAR. 16, 1910.

1,018,468.

Patented Feb. 27, 1912.

Witnesses:
Grant Claiborne
Agnes E. Caskey

Inventor
Roupen K. Yacoobian.

By William J. Jackson
Atty.

UNITED STATES PATENT OFFICE.

ROUPEN K. YACOOBIAN, OF PHILADELPHIA, PENNSYLVANIA.

WATER-MIXER.

1,018,468.  Specification of Letters Patent.  Patented Feb. 27, 1912.

Application filed March 16, 1910. Serial No. 549,647.

*To all whom it may concern:*

Be it known that I, ROUPEN K. YACOOBIAN, a subject of the Sultan of Turkey, residing at Philadelphia, in the county of Philadelphia and State of Pennsylvania, have invented certain new and useful Improvements in Water-Mixers, of which the following is a specification.

This invention has relation to devices for mixing hot and cold water and has more particular reference to an attachment adapted to be applied between the faucets of a bath-tub, sink, wash-basin or the like.

The principal object of the present invention is to provide a neat, attractive, simple, efficient and comparatively inexpensive mixer adapted to be readily attached between and removed from a hot and cold water faucet, whereby hot and cold water may be mixed together for use if desired or either one obtained separately as desired.

A further object of the present invention is to provide such a device in which the same constitutes an independent device complete in itself, which may be readily laid to one side when not in use, or which may be suspended above the faucets and suitably coupled thereto when desired.

Other objects of the invention relate to the providing of general details of construction and arrangement of parts as will hereinafter be more fully described.

The invention consists of the improvements hereinafter described and finally claimed.

Figure 1:
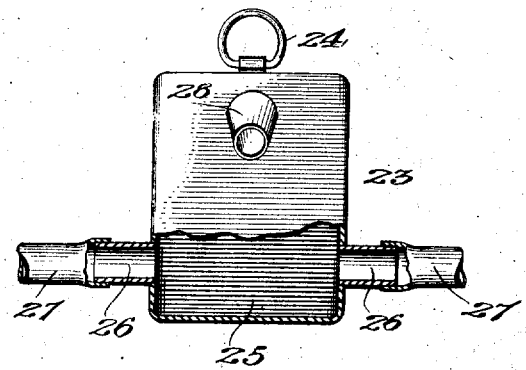
Figure 2:
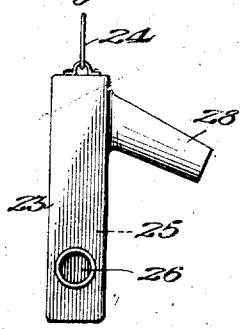
Figure 3:
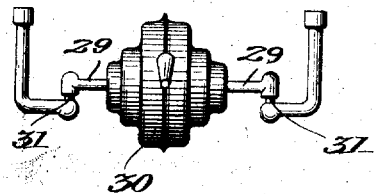

The nature, characteristic features and scope of the invention will be more fully understood from the following description taken in connection with the accompanying drawings forming part hereof and in which:

Figure 1, is a view in front elevation partly sectioned of the mixer of the invention, Fig. 2, is a view in side elevation thereof, and Fig. 3, is a view in front elevation of a slightly modified form of mixer.

Referring to the drawings and more particularly to Figs. 1, and 2, the mixer 23, is shown as being rectangular in configuration and capable of being suspended above hot and cold water faucets, the ring 24, serving this purpose. Laterally arranged with respect to and extending from the mixing chamber 25, are inlets 26, coupling which with the faucets are sections of hose 27. Arranged near the top of the mixing chamber 25, and projecting slightly downward therefrom is a discharge spout 28. By the above described arrangement and construction of parts it is obvious that the mixer may be suspended above a pair of faucets and readily connected to and disconnected therefrom by means of the hose connections 27.

In Fig. 3, the lateral extensions 29, of the mixing chamber 30, have swivel relation as at 31, with generally L-shaped members adapted for attachment to faucets, the purpose of the swivel connection being to secure proper adjustments.

By the above arrangement and construction of parts it will be evident that hot and cold water, by virtue of the large space through which it must pass is thoroughly commingled before discharging. Obviously by virtue of the thorough commingling of hot and cold water and also by reason of the fact that this commingling takes place in a confined mixing chamber taken together with the fact that the device may be readily attached to and detached from between existing water faucets a mixer is provided having commercial value.

What I claim is:

A water mixer adapted to be supported between hot and cold water faucets said mixer comprising a relatively large closed box-like structure, water inlets for said mixer, connections adapted for detachable application between said water inlets and the spigots of said faucets and a valveless discharge spout carried by the mixer at a point above the said water inlets but below the faucet tops the discharge point of said spout also being above the mixer inlets.

In testimony whereof I have hereunto signed my name.

ROUPEN K. YACOOBIAN.

Witnesses:
 WILLIAM J. JACKSON,
 AGNES E. CASKEY.